ns011182569B2

(12) United States Patent
Li et al.

(10) Patent No.: US 11,182,569 B2
(45) Date of Patent: Nov. 23, 2021

(54) METHOD AND APPARATUS FOR PROCESSING WORD VECTOR OF NEURAL MACHINE TRANSLATION MODEL, AND NON-TRANSITORY COMPUTER-READABLE RECORDING MEDIUM

(71) Applicants: Yihan Li, Beijing (CN); Boyan Liu, Beijing (CN); Shanshan Jiang, Beijing (CN); Yixuan Tong, Beijing (CN); Bin Dong, Beijing (CN)

(72) Inventors: Yihan Li, Beijing (CN); Boyan Liu, Beijing (CN); Shanshan Jiang, Beijing (CN); Yixuan Tong, Beijing (CN); Bin Dong, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 166 days.

(21) Appl. No.: 16/809,844

(22) Filed: Mar. 5, 2020

(65) Prior Publication Data
US 2020/0311353 A1 Oct. 1, 2020

(30) Foreign Application Priority Data

Mar. 25, 2019 (CN) .......................... 201910229505.8

(51) Int. Cl.
*G06F 40/58* (2020.01)
*G06N 3/04* (2006.01)
*G06F 40/30* (2020.01)
*G06N 3/08* (2006.01)

(52) U.S. Cl.
CPC .............. *G06F 40/58* (2020.01); *G06F 40/30* (2020.01); *G06N 3/0454* (2013.01); *G06N 3/0481* (2013.01); *G06N 3/088* (2013.01)

(58) Field of Classification Search
CPC ........ G06F 40/58; G06F 40/30; G06F 3/0481; G06N 3/0454; G06N 3/088
See application file for complete search history.

(56) References Cited

U.S. PATENT DOCUMENTS

| 10,282,420 | B2 | 5/2019 | Jiang et al. | |
|---|---|---|---|---|
| 11,093,714 | B1* | 8/2021 | Bhatia | G06N 3/0454 |
| 2018/0240013 | A1* | 8/2018 | Strope | G06F 16/335 |
| 2018/0336183 | A1* | 11/2018 | Lee | G06N 5/022 |
| 2018/0341863 | A1 | 11/2018 | Ding et al. | |
| 2019/0005090 | A1* | 1/2019 | Zhang | G06F 40/30 |
| 2019/0228319 | A1* | 7/2019 | Gupta | G06N 5/04 |
| 2019/0251164 | A1 | 8/2019 | Ding et al. | |
| 2019/0346272 | A1* | 11/2019 | Banino | G01C 21/20 |
| 2019/0391792 | A1* | 12/2019 | Sabharwal | G06N 3/0445 |
| 2020/0192985 | A1* | 6/2020 | Na | G06F 40/42 |
| 2021/0019478 | A1* | 1/2021 | Matsuoka | G06F 40/51 |
| 2021/0158789 | A1* | 5/2021 | Wu | G06F 40/44 |
| 2021/0182077 | A1* | 6/2021 | Chen | G06K 9/00268 |

* cited by examiner

*Primary Examiner* — Kevin Ky
(74) *Attorney, Agent, or Firm* — IPUSA, LLC

(57) ABSTRACT

A method and an apparatus for processing word vectors of a neural machine translation model, and a non-transitory computer-readable recording medium are provided. In the method, word vectors that are input to an encoder and a decoder of a neural machine translation model are updated using semantic information among head representations at the same time and semantic information among head representations at different times, and the model is trained or translation is performed using the updated word vectors, thereby improving the model performance of the neural machine translation model.

18 Claims, 5 Drawing Sheets

METHOD AND APPARATUS FOR PROCESSING WORD VECTOR OF NEURAL MACHINE TRANSLATION MODEL, AND NON-TRANSITORY COMPUTER-READABLE RECORDING MEDIUM

CROSS-REFERENCE TO RELATED APPLICATIONS

The present application claims priority under 35 U.S.C. § 119 to Chinese Application No. 201910229505.8 filed on Mar. 25, 2019, the entire contents of which are incorporated herein by reference.

BACKGROUND OF THE INVENTION

1. Field of the Invention

The present invention relates to the field of neural machine translation (NMT) in natural language processing (NLP), and specifically, a method and an apparatus for processing word vectors of a neural machine translation model, and a non-transitory computer-readable recording medium.

2. Description of the Related Art

Neural machine translation has made rapid progress in recent years and has been widely used in industry. Neural machine translation refers to a machine translation method that performs translation modeling directly using a neural network in an end-to-end manner. Neural machine translation performs translation using a simple and intuitive method, described as follows. First, a source language sentence is encoded into a dense vector using a neural network called an encoder, and then a target language sentence is decoded from the vector using a neural network called a decoder. The above neural network model is generally called an "Encoder-Decoder" structure.

The basic framework of neural machine translation is based on a neural network model, an encoder is used to learn a semantic representation of a source sentence, and a decoder is used to generate a target sentence. Generally, a neural machine translation model includes an attention mechanism before an encoder and a decoder. The attention mechanism focuses on an output of a current moment, and emphatically learns information in a source sentence to which the decoder should pay more attention at a next moment, based on the semantic representation of the source sentence.

Recently, researchers have carried out considerable research on such models of neural machine translation. Among them, the Transformer is a model proposed by Google, and the structure of the Transformer is also based on that of an encoder-decoder. The structure of a typical Transformer model is shown in FIG. 1. Unlike conventional models, the Transformer does not use a recurrent neural network (RNN) or a convolutional neural network (CNN), but uses a self-attention mechanism to extract semantic feature information of sentences. In the self-attention mechanism, an input D-dimensional vector is divided into H head representations, and the dimension of each head representation is D/H. Then, for each head representation at different times, a feature representation is learned using the attention mechanism. The self-attention mechanism is also called a multi-head attention mechanism. The Transformer model shows good translation results, however the performance of the multi-head attention model still has room for improvement.

SUMMARY OF THE INVENTION

According to an aspect of the present invention, a method for processing word vectors of a neural machine translation model is provided. The method includes obtaining a word vector sequence that is input to an encoder and a decoder of the neural machine translation model, the word vector sequence including at least two word vectors; dividing each word vector in the word vector sequence into a plurality of head representations with the same dimension; calculating, for each head representation serving as a target head representation, a first vector representation of the target head representation in a target word vector to which the target head representation belongs, the first vector representation being a non-linear function of a first intermediate vector, and the first intermediate vector being obtained by calculating a weighted sum of the head representations in the target word vector based on correlation parameters between respective head representations in the target word vector and the target head representation; calculating a weighted sum of head representations corresponding to respective word vectors in a target word vector sequence to which the target head representation belongs, based on attention parameters between the target head representation and head representations corresponding to respective word vectors in the target word vector sequence, to obtain a second vector representation of the target head representation among word vectors of the target word vector sequence; combining the first vector representation and the second vector representation of each of the head representations to obtain third vector representations of the respective head representations, and merging the third vector representations of the head representations in the respective word vectors to obtain the updated word vectors; and training the neural machine translation model or translating using the updated word vectors.

According to another aspect of the present invention, an apparatus for processing word vectors of a neural machine translation model is provided. The apparatus includes a word vector sequence obtaining unit configured to obtain a word vector sequence that is input to an encoder and a decoder of the neural machine translation model, the word vector sequence including at least two word vectors; a dividing unit configured to divide each word vector in the word vector sequence into a plurality of head representations with the same dimension; a first representing unit configured to calculate, for each head representation serving as a target head representation, a first vector representation of the target head representation in a target word vector to which the target head representation belongs, the first vector representation being a non-linear function of a first intermediate vector, and the first intermediate vector being obtained by calculating a weighted sum of the head representations in the target word vector based on correlation parameters between respective head representations in the target word vector and the target head representation; a second representing unit configured to calculate a weighted sum of head representations corresponding to respective word vectors in a target word vector sequence to which the target head representation belongs, based on attention parameters between the target head representation and head representations corresponding to respective word vectors in the target word vector sequence, to obtain a second vector representation of the target head representation among word vectors of the target word vector sequence; a combining-merging unit configured to combine the first vector representation and the second vector representation of each of the head representations to obtain third vector representations of the respective head representations, and merge the third vector representations of the head representations in the respective word vectors to obtain the updated word vectors; and a word vector updating unit configured to train the neural machine translation model or translate using the updated word vectors.

According to another aspect of the present invention, an apparatus for processing word vectors of a neural machine translation model is provided. The apparatus includes a memory storing computer-executable instructions; and one or more processors. The one or more processors are configured to execute the computer-executable instructions such that the one or more processors are configured to obtain a word vector sequence that is input to an encoder and a decoder of the neural machine translation model, the word vector sequence including at least two word vectors; divide each word vector in the word vector sequence into a plurality of head representations with the same dimension; calculate, for each head representation serving as a target head representation, a first vector representation of the target head representation in a target word vector to which the target head representation belongs, the first vector representation being a non-linear function of a first intermediate vector, and the first intermediate vector being obtained by calculating a weighted sum of the head representations in the target word vector based on correlation parameters between respective head representations in the target word vector and the target head representation; calculate a weighted sum of head representations corresponding to respective word vectors in a target word vector sequence to which the target head representation belongs, based on attention parameters between the target head representation and head representations corresponding to respective word vectors in the target word vector sequence, to obtain a second vector representation of the target head representation among word vectors of the target word vector sequence; combine the first vector representation and the second vector representation of each of the head representations to obtain third vector representations of the respective head representations, and merge the third vector representations of the head representations in the respective word vectors to obtain the updated word vectors; and train the neural machine translation model or translate using the updated word vectors.

According to another aspect of the present invention, a non-transitory computer-readable recording medium having computer-executable instructions for execution by one or more processors is provided. The computer-executable instructions, when executed, cause the one or more processors to carry out a method for processing word vectors of a neural machine translation model. The method includes obtaining a word vector sequence that is input to an encoder and a decoder of the neural machine translation model, the word vector sequence including at least two word vectors; dividing each word vector in the word vector sequence into a plurality of head representations with the same dimension; calculating, for each head representation serving as a target head representation, a first vector representation of the target head representation in a target word vector to which the target head representation belongs, the first vector representation being a non-linear function of a first intermediate vector, and the first intermediate vector being obtained by calculating a weighted sum of the head representations in the target word vector based on correlation parameters between respective head representations in the target word vector and the target head representation; calculating a weighted sum of head representations corresponding to respective word vectors in a target word vector sequence to which the target head representation belongs, based on attention parameters between the target head representation and head representations corresponding to respective word vectors in the target word vector sequence, to obtain a second vector representation of the target head representation among word vectors of the target word vector sequence; combining the first vector representation and the second vector representation of each of the head representations to obtain third vector representations of the respective head representations, and merging the third vector representations of the head representations in the respective word vectors to obtain the updated word vectors; and training the neural machine translation model or translating using the updated word vectors.

BRIEF DESCRIPTION OF THE DRAWINGS

The above and other objects, features and advantages of the present invention will be further clarified by describing, in detail, embodiments of the present invention in combination with the drawings.

DESCRIPTION OF THE EMBODIMENTS

In the following, specific embodiments of the present invention will be described in detail with reference to the accompanying drawings, so as to facilitate the understanding of technical problems to be solved by the present invention, technical solutions of the present invention, and advantages of the present invention. The present invention is not limited to the specifically described embodiments, and various modifications, combinations and replacements may be made without departing from the scope of the present invention. In addition, descriptions of well-known functions and constructions are omitted for clarity and conciseness.

Note that "one embodiment" or "an embodiment" mentioned in the present specification means that specific features, structures or characteristics relating to the embodiment are included in at least one embodiment of the present invention. Thus, "one embodiment" or "an embodiment" mentioned in the present specification may not be the same embodiment. Additionally, these specific features, structures or characteristics may be combined in any suitable manner in one or more embodiments.

Note that steps of the methods may be performed in time order, however the performing sequence is not limited to the time order. Further, the described steps may be performed in parallel or independently.

In view of the problem of the conventional technology, an object of the embodiments of the present invention is to provide a method and an apparatus for processing word vectors of a neural machine translation model, and a non-transitory computer-readable recording medium, which fully utilize semantic information among head representations at the same time and semantic information among head representations at different times during model training or translating, thereby improving translation performance of neural machine translation.

Figure 1:
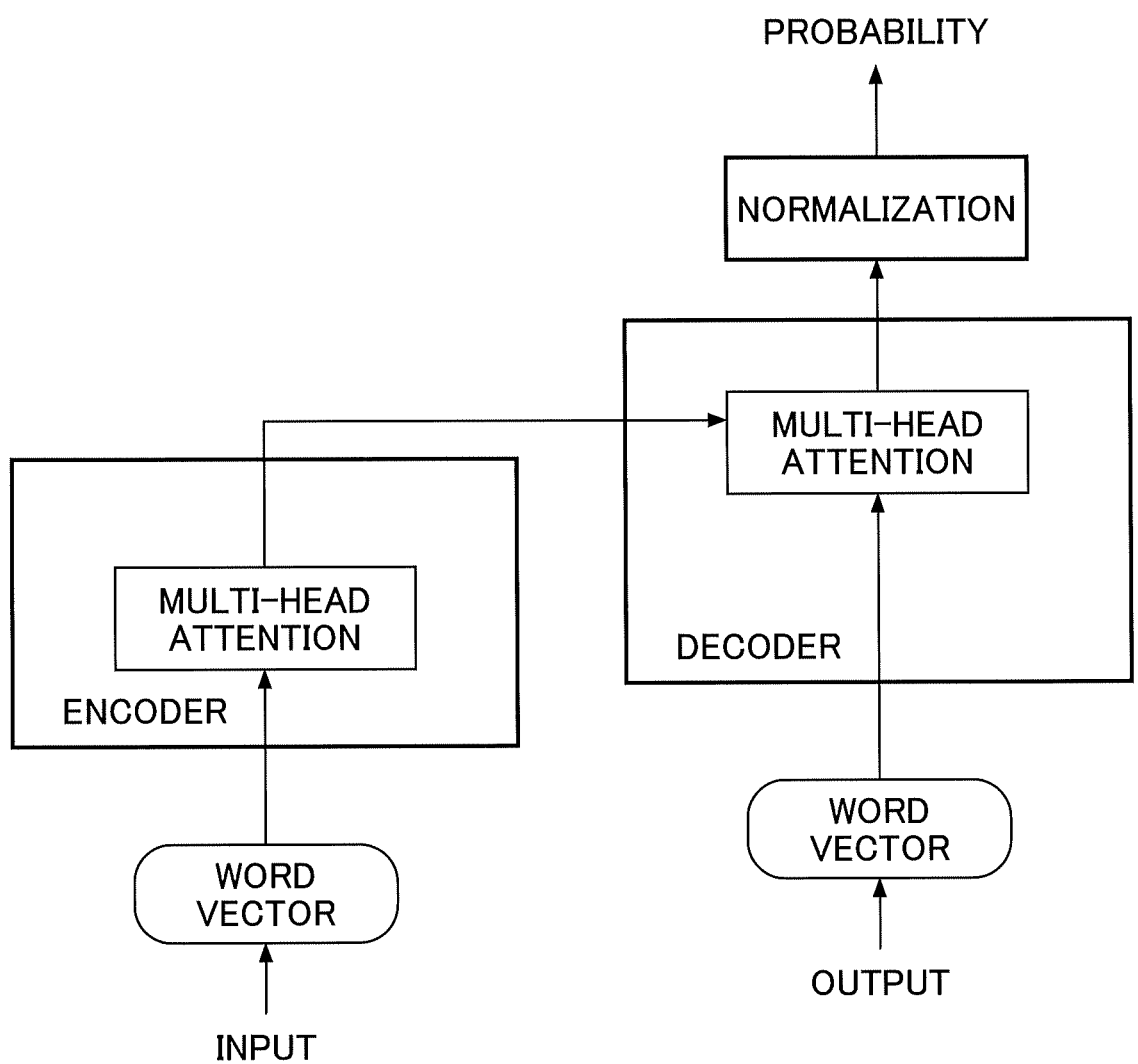
FIG. 1 is a schematic diagram illustrating the structure of a conventional Transformer model.
Figure 2:
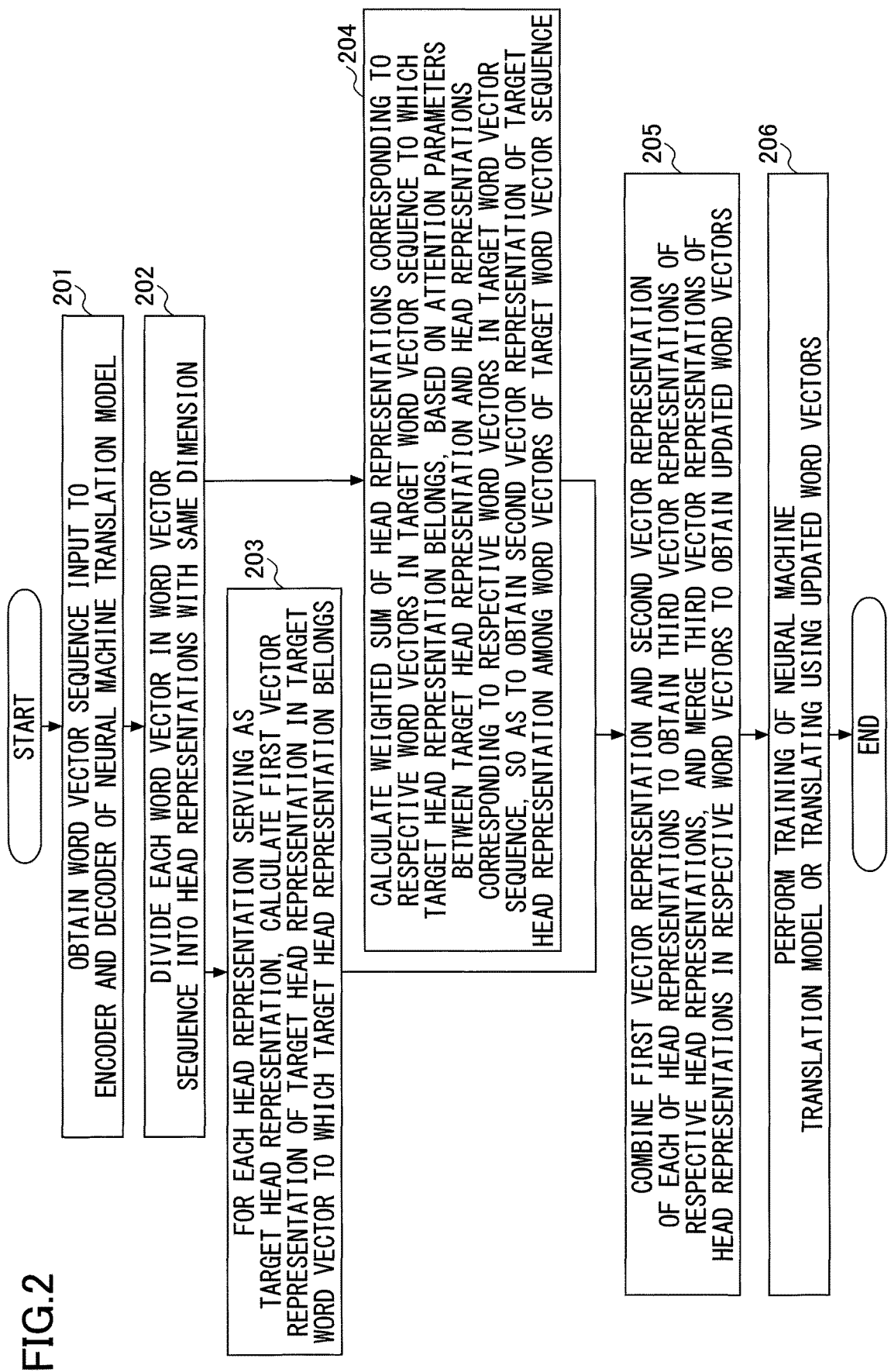
FIG. 2 is a flowchart illustrating the word vector processing method of a neural machine translation model according to an embodiment of the present invention.

FIG. 2 is a flowchart illustrating a word vector processing method of a neural machine translation model according to an embodiment of the present invention. The word vector processing method of the neural machine translation model may be applied to a training process of the neural machine translation model, and can improve the performance of the trained model. The word vector processing method of the neural machine translation model may also be applied to an actual translating process of the neural machine translation model, and can improve the translation performance of sentences to be translated. Specifically, the neural machine translation model may be a sequence-to-sequence (seq2seq) model, a convolutional sequence-to-sequence (convS2S) model, or a transformer model. Note that the embodiments of the present invention may also be applied to other types of neural machine translation models, and the present invention is not specifically limited.

As shown in FIG. 2, the word vector processing method of the neural machine translation model according to the embodiment of the present invention includes steps 201 to 206.

In step 201, a word vector sequence that is input to an encoder and a decoder of the neural machine translation model is obtained. The word vector sequence includes at least two word vectors.

Here, the word vector sequence that is input to the encoder and the decoder includes at least two word vectors at different times. In neural machine translation, words constituting a sentence correspond to different times. The word vector processing method according to the embodiment of the present invention may be applied to a training process of the neural machine translation model, and may also be applied to an actual translation process of the neural machine translation model. In step 201, the word vector sequence that is input to an encoder end and a decoder end of the neural machine translation model is obtained. The word vectors in the word vector sequence are updated in subsequent steps, thereby performing model training or actual translating using the updated word vectors.

As an example, in the process of training a neural machine translation model, source sentences in a parallel corpus are converted into a word vector sequence including one or more word vectors and are input to an encoder. Target sentences in the parallel corpus are also converted into a word vector sequence and are input to a decoder, thereby training the model. Accordingly, in a case where the word vector processing method according to the embodiment of the present invention is applied to a training process of the neural machine translation model, in step 201, the word vector sequence obtained at the encoder end is the word vector sequence of the source sentence, and the word vector sequence obtained at the decoder end is the word vector sequence of the target sentence.

As another example, during the process of translating a first sentence with trained neural machine translation model to obtain a translated second sentence, a word vector sequence corresponding to the first sentence is input to an encoder to sequentially obtain word vectors of the second sentence, and a word vector sequence consisting of the currently obtained word vectors of the second sentence is input to a decoder to predict a next word vector of the second sentence. Accordingly, in a case where the word vector processing method according to the embodiment of the present invention is applied to an actual translating process of the neural machine translation model, in step 201, the word vector sequence obtained at the encoder end is the word vector sequence of the first sentence to be translated, and the word vector sequence obtained at the decoder end is the word vector sequence consisting of the currently obtained word vectors translated from the first sentence.

In step 202, each word vector in the word vector sequence is divided into a plurality of head representations with the same dimension.

Here, as an example of dividing method, each word vector may be divided into a plurality of head representations connected in sequence, the head representations have the same dimension, and there is no overlap between different head representations. For example, assuming that the word vector is 512-dimensional, the word vector may be divided into 8 head representations, and the dimensions of all of the head representations are 64-dimensional. Namely, the 1st to 64th elements in the word vector are the 1st head representation, the 65th to 128th elements are the 2nd head representation, and so on.

Note that the embodiment of the present invention may also adopt other different dividing methods, as long as the numbers of all head representations divided from word vectors are the same and the dimensions of all head representations are the same.

In step 203, for each head representation serving as a target head representation, a first vector representation of the target head representation in the target word vector to which the target head representation belongs is calculated. Here, the first vector representation is a non-linear function of a first intermediate vector, and the first intermediate vector is obtained by calculating a weighted sum of the head representations in the target word vector, based on correlation parameters between respective head representations in the target word vector and the target head representation.

In the embodiment of the present invention, for each head representation (for convenience of description, the currently processed head representation is referred to as a target head representation), it is necessary to calculate the first vector representation of the head representation. In the calculation process, the correlation parameter among the head representations in the word vector to which the head representation belongs (for convenience of description, the word vector is referred to as the target word vector) is introduced. Here, the correlation parameter is a model parameter updated by learning during a training process of the neural machine translation model, and a specific updating manner may refer to a training process of a model parameter in the prior art.

Specifically, in step 203, the weighted sum of the head representations in the target word vector may be calculated based on the correlation parameters between the respective head representations in the target word vector and the target head representation, to obtain the first intermediate vector. Then, the first intermediate vector may be converted into word vector representations with the same dimension using a preset non-linear function, to obtain the first vector representation of the target head representation in the target word vector.

Here, the non-linear function may preferably be a hyperbolic tangent (tanh) function, and may also be an S-shaped growth curve (Sigmoid) function or a rectified linear (ReLU) function. Note that the embodiment of the present invention is not specifically limited.

Figure 3:
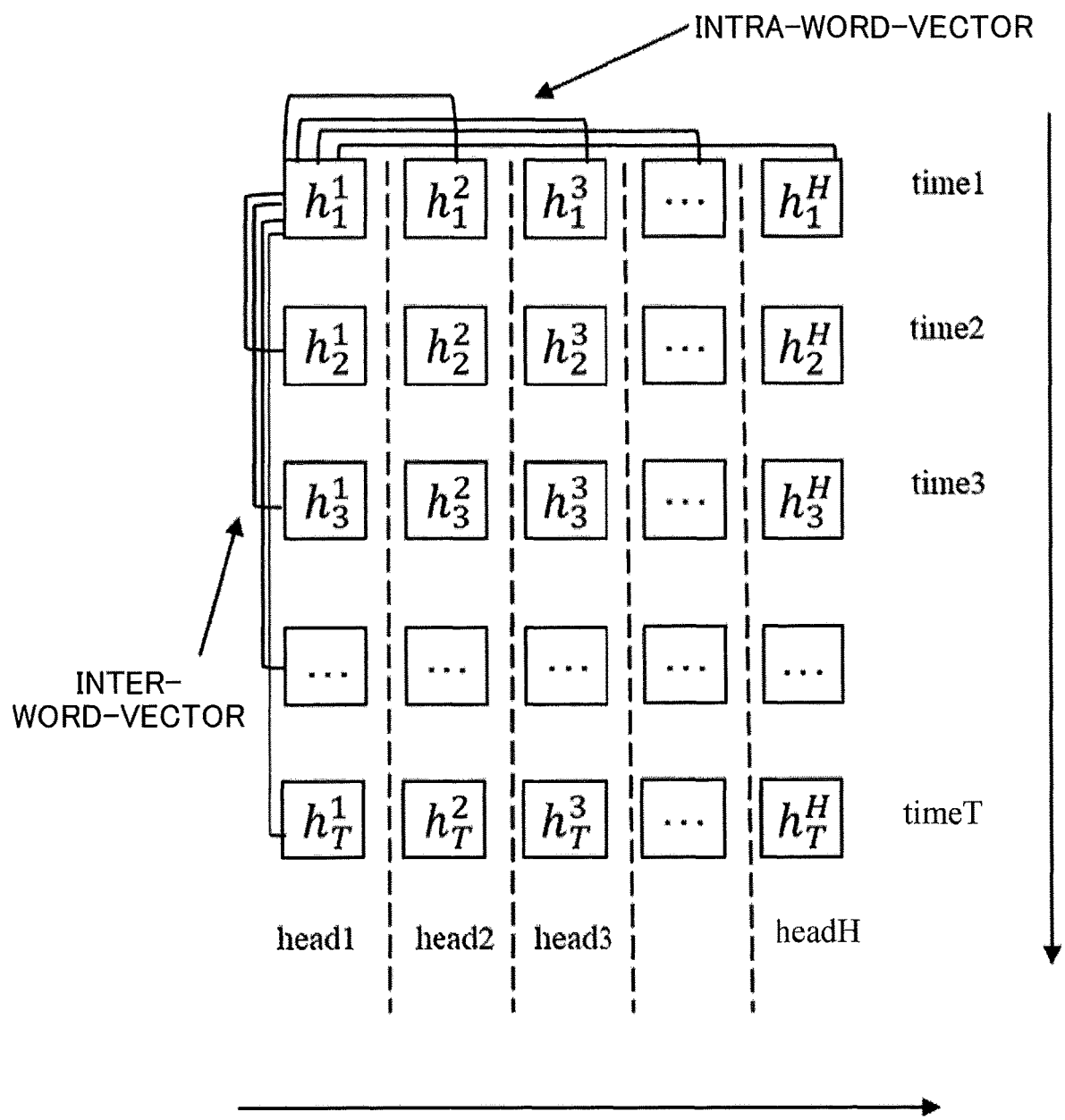
FIG. 3 is a schematic diagram illustrating an example of word vector processing according to the embodiment of the present invention.

FIG. 3 shows a specific example of word vector processing. The word vector sequence shown in FIG. 3 includes T word vectors corresponding to different times (such as time1, time2, . . . , timeT). In FIG. 3, a word vector is divided into H head representations (such as head1, head2, . . . , headH), each box in FIG. 3 represents a head representation, and for example $h_i^k$ represents the k-th head representation of the word vector i. Each row in FIG. 3 represents a word vector in a word vector sequence, and includes H header representations; each column includes T header representations that have the same rank position (namely, the same k value) in the respective word vectors to which the header representations belong respectively.

In step 203, for each head representation, the first vector representation of the head representation in the word vector is calculated using the correlation parameters between the respective head representations in a row where the head representation is located and the head representation.

It can be seen that, by the calculation process of step 203, in the first vector representation, the semantic information between respective head representations in the same word vector and the target head representation is introduced, namely, the semantic information among the head representations at the same time in the word vector sequence is introduced.

Preferably, in calculating the weighted sum, normalization processing may be performed on the correlation parameters between the respective head representations in the target word vector and the target head representation to obtain respective first weights of the head representations in the target word vector. Then, the weighted sum of the head representations in the target word vector may be calculated based on the respective first weights, to obtain the first intermediate vector.

In step 204, a weighted sum of the head representations corresponding to respective word vectors in a target word vector sequence to which the target head representation belongs is calculated, based on attention parameters between the target head representation and the head representations corresponding to respective word vectors in the target word vector sequence, to obtain a second vector representation of the target head representation among word vectors of the target word vector sequence.

In the embodiment of the present invention, the second vector representation of the target head representation among the word vectors of the word vector sequence to which the target head representation belongs (for convenience of description, the word vector sequence is referred to as the target word vector sequence) is also calculated.

Specifically, the attention parameters between the target head representation and the head representations corresponding to the respective word vectors in the target word vector sequence may be calculated based on a preset attention function. Then, normalization processing may be performed on the attention parameters between the target head representation and the head representations corresponding to the respective word vectors in the target word vector sequence to obtain respective second weights of the head representations corresponding to the respective word vectors in the target word vector sequence. Here, the head representations corresponding to the respective word vectors in the target word vector sequence (for convenience of description, the head representation is referred to as a reference head representation) indicates that the rank position of the reference head representation in the word vector sequence to which the reference head representation belongs is the same as the rank position of the target head representation in the word vector sequence to which the target head representation belongs. Finally, the weighted sum of the head representations corresponding to the respective word vectors in the target word vector sequence is calculated based on the respective second weights, to obtain the second vector representation of the target head representation among word vectors of the target word vector sequence.

Here, the attention function may be a function commonly used in a neural network structure, which is used to measure semantic association between two vectors. Note that the embodiment of the present invention is not specifically limited.

As shown in FIG. 3, for example, in step 204, for each head representation, the second vector representation of the head representation among the word vectors is calculated using the attention parameters between respective head representations in a column where the head representation is located and the head representation.

It can be seen that, by the calculation process of step 204, in the second vector representation, the semantic information, between respective corresponding head representations in the same word vector sequence and the target head representation, is introduced, namely, the semantic information among the head representations at the different times in the word vector sequence is introduced.

Step 205: the first vector representation and the second vector representation of each of the head representations are combined to obtain third vector representations of the respective head representations, and the third vector representations of the head representations in the respective word vectors are merged to obtain the updated word vectors.

Here, the first vector representation and the second vector representation of the head representation are obtained in above steps 203 and 204, and the first vector representation and the second vector representation are combined in step 205. Specifically, a first product of a first combination parameter and the first vector representation of the head representation may be calculated, a second product of a second combination parameter and the second vector representation of the head representation may be calculated, and a sum of the first product and the second product may be calculated to obtain the third vector representation of the head representation. Here, the first combination parameter and the second combination parameter are model parameters updated by learning during training of the neural machine translation model.

It can be seen that, in the third vector representation of the head representation, the semantic information among the head representations at the same time and the semantic information among the head representations at the different times in the word vector sequence are simultaneously introduced.

Here, after obtaining the third vector representation of each head representation, the third vector representations of the head representations in the respective word vectors that are input to the encoder or the decoder may be merged in an inverse manner with respect to the dividing processing in step 202. Accordingly, the word vectors are updated to obtain the updated word vectors.

Step 206: training of the neural machine translation model or translating is performed using the updated word vectors.

In the embodiment of the present invention, after the word vectors that are input to the encoder or the decoder are updated in step 205, the training of the neural machine translation model or the translating may be performed using the updated word vectors.

From above, in the word vector processing method of the embodiment of the present invention, the word vectors that are input to the encoder and the decoder of the neural machine translation model are updated using the semantic information among the head representations at the same time and the semantic information among the head representations at different times, and the training of the model or the translating is performed using the updated word vectors. The semantic information among the head representations at the same time and the semantic information among the head representations at different times are simultaneously considered, thus the model performance of the neural machine translation model according to the embodiment of the present invention can be improved.

In addition, in the embodiment of the present invention, before step 201, a sentence (such as a source sentence or a target sentence) that is input to the encoder or the decoder may be mapped into a word vector sequence consisting of word vectors. The mapping of the word vectors may refer to the implementation in the prior art. For example, word vector representations may be trained based on a collected corpus such as a preprocessed corpus. Word vectors may also be trained using a word vector training tool such as word2vec, glove, or the like to form a word vector library. Then, each word in an input sentence is mapped into a word vector from the trained word vector library.

In the following, an example of the steps in the above method will be described in detail.

Suppose that an input sentence S may be expressed as $(x_1, x_2, \ldots, x_n)$, where $x_i$ is the i-th word in the sentence.

(1) First, word vectors of words may be obtained by performing training using a word2vec method based on a Wikipedia Chinese corpus. The word vector is vector representation of word semantics. The trained word vector is expressed as WE, and for a word w, its word vector may be expressed as WE(w).

Then, a word vector sequence of a sentence S is obtained based on the word vector WE. For a word $x_i$ in S, its word vector may be expressed as WE $(x_i)$. Thus, the sentence S may be expressed as (WE($x_1$), WE($x_2$), WE($x_3$), ..., WE($x_n$)). For simplicity, the above sentence S may also be expressed as $(h_1, h_2, \ldots, h_n)$, where $h_i$ represents WE($x_i$). Note that $h_i$ represents a semantic vector of the word $x_i$ (namely, the word vector), and its dimension is denoted as D, respective dimensions represent respective different features.

(2) The calculation of the first vector representation includes the following steps.

Each word vector $h_i$ is divided into H head representations. Here, H may be a user-defined constant, such as H=8, and its size may be set to a constant divisible by the dimension D of $h_i$. As a result, the dimension of each head representation after dividing is D/H. For $h_i$, the head representations after dividing may be expressed as $(h_i^1, h_i^2, h_i^3, \ldots, h_i^H)$.

For the k-th head representation $h_i^k$ in word vector $h_i$, its first vector representation is denoted as $Y_i^k$, and may be calculated using the following formulas.

$$y_i^k = \tanh(Q_i^k)$$

$$Q_i^k = \sum_{j=1}^{H} u_i^{j,k} * h_i^j$$

$$u_i^{j,k} = \frac{W_i^{j,k}}{\sum_{j=1}^{H} W_i^{j,k}}$$

Where $W_i^{j,k}$ is a training parameter updated by learning during model training, and represents a correlation parameter between head representation $h_i^j$ and head representation $h_i^k$ in word vector $h_i$. It is intuitively understood that the first vector representation is a non-linear function of all intrinsic features in the word vector (intra word vector). In the above formula, the correlation parameters of the respective heads are normalized, then a first intermediate vector $Q_i^k$ is obtained by calculating a weighted sum, and finally the first intermediate vector is mapped to a non-linear space by using a tanh function to obtain the first vector representation.

(3) The calculation of the second vector representation includes the following steps.

For the k-th head representation $h_i^k$ in word vector $h_i$, correlation among head representations at different times is measured based on an attention function, and then the second vector representation $P_i^k$ is calculated, which represents the head representation among word vectors (inter word vector). A specific calculation method is shown in the following formulas.

$$a_{i,j}^k = attentionFun(h_i^k, h_j^k)$$

$$e_{i,j}^k = \frac{a_{i,j}^k}{\sum_{l=1}^{l=N} a_{i,l}^k}$$

$$P_i^k = \sum_{l=1}^{T} e_{i,l}^k * h_l^k$$

Where attentionFun represents the attention function for measuring semantic association between two vectors, which may refer to functions commonly used in the structure of a neural network.

(4) Combining of the first vector representation and the second vector representation may include the following calculation steps.

For head representation $h_i^k$, after calculation of combination in this step, third vector representation $Z_i^k$ of head representation $h_i^k$ is obtained. $Z_i^k$ is determined by learning based on $P_i^k$ and $Y_i^k$, and the calculation formula is as follows.

$$Z_i^k = w_p P_i^k + w_y Y_i^k$$

Where $w_p$ and $w_y$ are model parameters updated by learning during model training, and are determined by learning during training.

As a final output result of the word vector $h_i$, the third vector representations of all head representations in word vector $h_i$ are merged using the following formula.

$$CrossMultiHead(h_i) = Concat(Z_i^1, Z_i^2, Z_i^3, \ldots, Z_i^H)$$

By the above calculation process, a new cross-attention mechanism according to the embodiment of the present invention is implemented, which can be directly used in models such as Transformer. Next, the model may be trained using the given parallel corpus. The training process may refer to conventional Transformer models, and the model obtained when the training is completed may be used for translation.

Compared with the conventional technology, in the word vector processing method of the neural machine translation model, the word vectors that are input to the encoder and the decoder of the neural machine translation model are updated using the semantic information among the head representations at the same time and the semantic information among the head representations at different times, and the training of the model or the translating is performed using the updated word vectors. The semantic information among the head representations at the same time and the semantic information among the head representations at different times are simultaneously considered, thus the model performance of the neural machine translation model according to the embodiment of the present invention can be improved.

Figure 4:
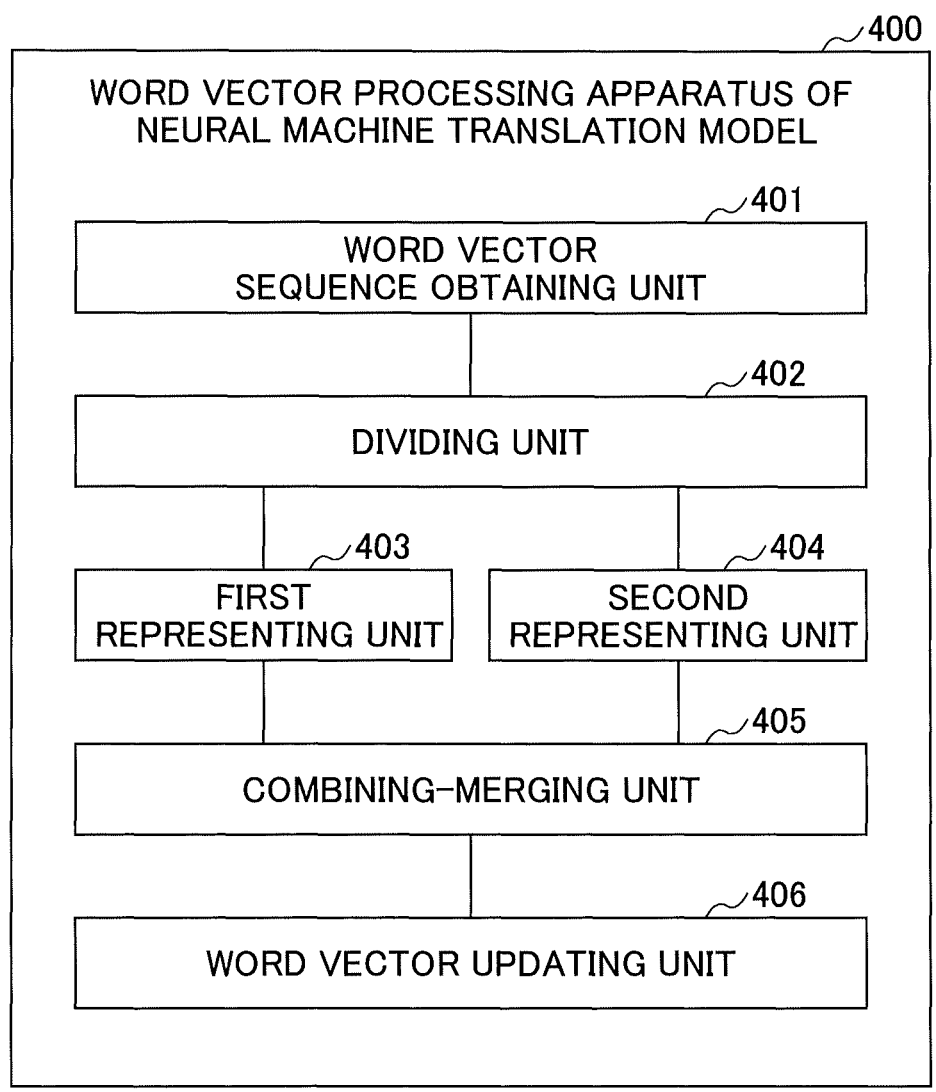
FIG. 4 is a block diagram illustrating the configuration of a word vector processing apparatus of a neural machine translation model according to an embodiment of the present invention.

An embodiment of the present invention further provides a word vector processing apparatus of a neural machine translation model. FIG. 4 is a block diagram illustrating a configuration of a word vector processing apparatus 400 of a neural machine translation model according to an embodiment of the present invention. As shown in FIG. 4, the word vector processing apparatus 400 may be used to process word vectors at an encoder end and a decoder end. The word vector processing apparatus 400 specifically includes a word vector sequence obtaining unit 401, a dividing unit 420, a first representing unit 403, a second representing unit 404, a combining-merging unit 405, and a word vector updating unit 406.

The word vector sequence obtaining unit 401 obtains a word vector sequence that is input to an encoder and a decoder of the neural machine translation model. Here, the word vector sequence includes at least two word vectors.

The dividing unit 402 divides each word vector in the word vector sequence into a plurality of head representations with the same dimension.

The first representing unit 403 calculates, for each head representation serving as a target head representation, a first vector representation of the target head representation in a target word vector to which the target head representation belongs. Here, the first vector representation is a non-linear function of a first intermediate vector, and the first intermediate vector is obtained by calculating a weighted sum of the head representations in the target word vector based on correlation parameters between respective. head representations in the target word vector and the target head representation The second representing unit 404 calculates a weighted sum of head representations corresponding to respective word vectors in a target word vector sequence to which the target head representation belongs, based on attention parameters between the target head representation and head representations corresponding to respective word vectors in the target word vector sequence, to obtain a second vector representation of the target head representation among word vectors of the target word vector sequence.

The combining-merging unit 405 combines the first vector representation and the second vector representation of each of the head representations to obtain third vector representations of the respective head representations, and merges the third vector representations of the head representations in the respective word vectors to obtain the updated word vectors.

The word vector updating unit 406 trains of the neural machine translation model or translates using the updated word vectors.

Preferably, the first representing unit 403 calculates the weighted sum of the head representations in the target word vector based on the correlation parameters between the respective head representations in the target word vector and the target head representation, to obtain the first intermediate vector. The correlation parameters are model parameters updated by learning during a training process of the neural machine translation model. The first representing unit 403 then converts the first intermediate vector into word vector representations with the same dimension using a preset non-linear function, to obtain the first vector representation of the target head representation in the target word vector.

Preferably, the first representing unit 403 performs normalization processing on the correlation parameters between the respective head representations in the target word vector and the target head representation to obtain the respective first weights of the head representations in the target word vector. The first representing unit 403 then calculates the weighted sum of the head representations in the target word vector based on the respective first weights, to obtain the first intermediate vector.

Preferably, the non-linear function is a hyperbolic tangent (tanh) function, an S-shaped growth curve (Sigmoid) function, or a rectified linear (ReLU) function.

Preferably, the second representing unit 404 calculates the attention parameters between the target head representation and the head representations corresponding to the respective word vectors in the target word vector sequence, based on a preset attention function. The second representing unit 404 then performs normalization processing on the attention parameters between the target head representation and the head representations corresponding to the respective word vectors in the target word vector sequence to obtain respective second weights of the head representations corresponding to the respective word vectors in the target word vector sequence. The second representing unit 404 then calculates the weighted sum of the head representations corresponding to the respective word vectors in the target word vector sequence based on the respective second weights, to obtain the second vector representation of the target head representation among word vectors of the target word vector sequence.

Preferably, the combining-merging unit 405 calculates a first product of a first combination parameter and the first vector representation of the head representation, calculates a second product of a second combination parameter and the second vector representation of the head representation, and calculates the sum of the first product and the second product to obtain the third vector representation of the head representation. Here, the first combination parameter and the second combination parameter are model parameters updated by learning during the training of the neural machine translation model.

In view of the above, in the word vector processing apparatus 400 of the neural machine translation model according to the embodiment of the present invention, the word vectors that are input to the encoder and the decoder of the neural machine translation model are updated using the semantic information among the head representations at the same time and the semantic information among the head representations at different times, and the training of the model or the translating is performed using the updated word vectors, thereby greatly improving the model performance of the neural machine translation model.

Figure 5:
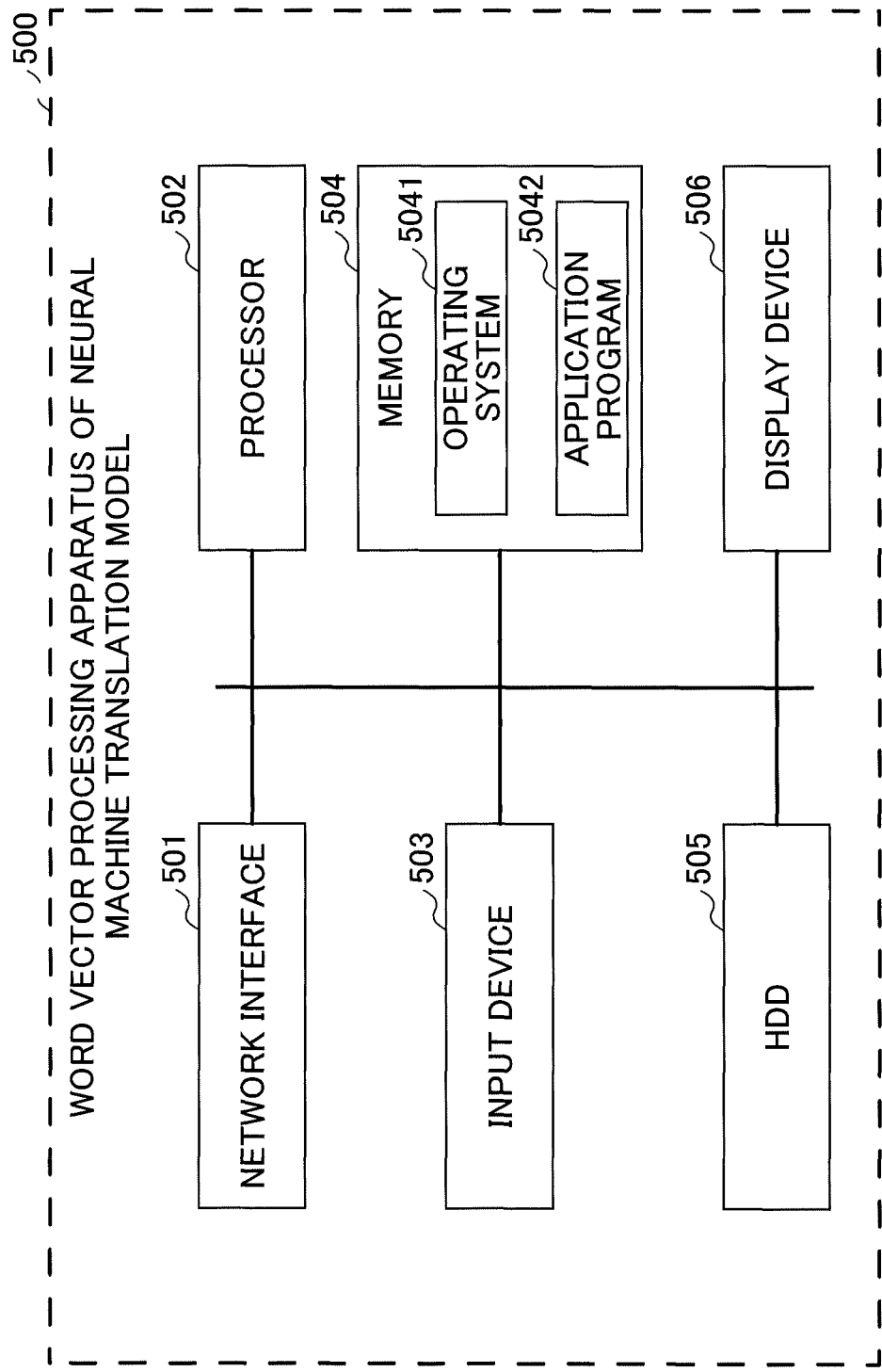
FIG. 5 is a block diagram illustrating the configuration of a word vector processing apparatus of a neural machine translation model according to another embodiment of the present invention.

An embodiment of the present further provides a word vector processing apparatus of a neural machine translation model. FIG. 5 is a block diagram illustrating the configuration of a word vector processing apparatus 500 of a neural machine translation model according to another embodiment of the present invention. As shown in FIG. 5, the word vector processing apparatus 500 includes a processor 502, and a memory 504 storing computer-executable instructions.

When the computer-executable instructions are executed by the processor 502, the processor 502 obtains a word vector sequence that is input to an encoder and a decoder of the neural machine translation model, the word vector sequence including at least two word vectors; divides each word vector in the word vector sequence into a plurality of head representations with the same dimension; calculates, for each head representation serving as a target head representation, a first vector representation of the target head representation in a target word vector to which the target head representation belongs, the first vector representation being a non-linear function of a first intermediate vector, and the first intermediate vector being obtained by calculating a weighted sum of the head representations in the target word vector based on correlation parameters between respective head representations in the target word vector and the target head representation; calculates a weighted sum of head representations corresponding to respective word vectors in a target word vector sequence to which the target head representation belongs, based on attention parameters between the target head representation and head representations corresponding to respective word vectors in the target word vector sequence, to obtain a second vector representation of the target head representation among word vectors of the target word vector sequence; combines the first vector representation and the second vector representation of each of the head representations to obtain third vector representations of the respective head representations, and merges the third vector representations of the head representations in the respective word vectors to obtain the updated word vectors; and performs training of the neural machine translation model or translating using the updated word vectors.

Furthermore, as illustrated in FIG. 5, the word vector processing apparatus 500 further includes. a network interface 501, an input device 503, a hard disk drive (HDD) 505, and a display device 506.

Each of the ports and each of the devices may be connected to each other via a bus architecture. The processor 502, such as one or more central processing units (CPUs), and the memory 504, such as one or more memory units, may be connected via various circuits. Other circuits such as an external device, a regulator, and a power management circuit may also be connected via the bus architecture. Note that these devices are communicably connected via the bus architecture. The bus architecture includes a power supply bus, a control bus and a status signal bus besides a data bus. The detailed description of the bus architecture is omitted here.

The network interface 501 may be connected to a network (such as the Internet, a LAN or the like), collect a corpus from the network, and store the collected corpus in the hard disk drive 505.

The input device 503 may receive various commands such as predetermined threshold and its setting information input by a user, and transmit the commands to the processor 502 to be executed. The input device 503 may include a keyboard, a click apparatus (such as a mouse or a track ball), a touch board, a touch panel or the like.

The display device 506 may display a result obtained by executing the commands, for example, a progress of model training and a translation result of a sentence to be translated.

The memory 504 stores programs and data required for running an operating system, and data such as intermediate results in calculation processes of the processor 502.

Note that the memory 504 of the embodiments of the present invention may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM) or a flash memory. The volatile memory may be a random access memory (RAM), which may be used as an external high-speed buffer. The memory 504 of the apparatus or the method is not limited to the described types of memory, and may include any other suitable memory.

In some embodiments, the memory 504 stores executable modules or data structure, their subsets, or their superset, i.e., an operating system (OS) 5041 and an application program 5042.

The operating system 5041 includes various system programs for realizing various essential tasks and processing tasks based on hardware, such as a frame layer, a core library layer, a drive layer and the like. The application program 5042 includes various application programs for realizing various application tasks, such as a browser and the like. A program for realizing the method according to the embodiments of the present invention may be included in the application program 5042.

The method according to the above embodiments of the present invention may be applied to the processor 502 or may be realized by the processor 502. The processor 502 may be an integrated circuit chip capable of processing signals. Each step of the above method may be realized by instructions in a form of integrated logic circuit of hardware in the processor 502 or a form of software. The processor 502 may be a general-purpose processor, a digital signal processor (DSP), an application specific integrated circuit (ASIC), field programmable gate array signals (FPGA) or other programmable logic device (PLD), a discrete gate or transistor logic, discrete hardware components capable of realizing or executing the methods, the steps and the logic blocks of the embodiments of the present invention. The general-purpose processor may be a micro-processor, or alternatively, the processor may be any common processor. The steps of the method according to the embodiments of the present invention may be realized by a hardware decoding processor, or combination of hardware modules and software modules in a decoding processor. The software modules may be located in a conventional storage medium such as a random access memory (RAM), a flash memory, a read-only memory (ROM), a erasable programmable read-only memory (EPROM), an electrically erasable programmable read-only memory (EEPROM), a register or the like. The storage medium is located in the memory 504, and the processor 502 reads information in the memory 504 and realizes the steps of the above methods in combination with hardware.

Note that the embodiments described herein may be realized by hardware, software, firmware, intermediate code, microcode or any combination thereof. For hardware implementation, the processor may be realized in one or more application specific integrated circuits (ASIC), digital signal processing devices (DSPD), programmable logic devices (PLD), field programmable gate array signals (FPGA), general-purpose processors, controllers, microcontrollers, micro-processors, or other electronic components or their combinations for realizing functions of the present invention.

For software implementation, the embodiments of the present invention may be realized by executing functional modules (such as processes, functions or the like). Software codes may be stored in a memory and executed by a processor. The memory may be implemented inside or outside the processor.

Specifically, when the computer-readable instructions are executed by the processor 502, the processor 502 may calculate the weighted sum of the head representations in the target word vector based on the correlation parameters between the respective head representations in the target word vector and the target head representation, to obtain the first intermediate vector, the correlation parameters being model parameters updated by learning during a training process of the neural machine translation model; and convert the first intermediate vector into word vector representations with the same dimension using a preset non-linear function, to obtain the first vector representation of the target head representation in the target word vector.

Specifically, when the computer-readable instructions are executed by the processor 502, the processor 502 may perform normalization processing on the correlation parameters between the respective head representations in the target word vector and the target head representation to obtain respective first weights of the head representations in the target word vector; and calculate the weighted sum of the head representations in the target word vector based on the respective first weights, to obtain the first intermediate vector.

Preferably, the non-linear function is a hyperbolic tangent (tanh) function, an S-shaped growth curve (Sigmoid) function, or a rectified linear (ReLU) function.

Specifically, when the computer-readable instructions are executed by the processor 502, the processor 502 may calculate the attention parameters between the target head representation and the head representations corresponding to the respective word vectors in the target word vector sequence, based on a preset attention function; perform normalization processing on the attention parameters between the target head representation and the head representations corresponding to the respective word vectors in the target word vector sequence to obtain respective second weights of the head representations corresponding to the respective word vectors in the target word vector sequence; and calculate the weighted sum of the head representations corresponding to the respective word vectors in the target word vector sequence based on the respective second weights, to obtain the second vector representation of the target head representation among word vectors of the target word vector sequence.

Specifically, when the computer-readable instructions are executed by the processor 502, the processor 502 may calculate a first product of a first combination parameter and the first vector representation of the head representation, calculate a second product of a second combination parameter and the second vector representation of the head representation, and calculate a sum of the first product and the second product to obtain the third vector representation of the head representation. Here, the first combination parameter and the second combination parameter are model parameters updated by learning during the training process of the neural machine translation model.

An embodiment of the present invention further provides a non-transitory computer-readable recording medium having computer-executable instructions for execution by one or more processors. The execution of the computer-executable instructions cause the one or more processors to carry out a method for processing word vectors of a neural machine translation model. The method includes obtaining a word vector sequence that is input to an encoder and a decoder of the neural machine translation model, the word vector sequence including at least two word vectors; dividing each word vector in the word vector sequence into a plurality of head representations with the same dimension; calculating, for each head representation serving as a target head representation, a first vector representation of the target head representation in a target word vector to which the target head representation belongs, the first vector representation being a non-linear function of a first intermediate vector, and the first intermediate vector being obtained by calculating a weighted sum of the head representations in the target word vector based on correlation parameters between respective head representations in the target word vector and the target head representation; calculating a weighted sum of head representations corresponding to respective word vectors in a target word vector sequence to which the target head representation belongs, based on attention parameters between the target head representation and head representations corresponding to respective word vectors in the target word vector sequence, to obtain a second vector representation of the target head representation among word vectors of the target word vector sequence; combining the first vector representation and the second vector representation of each of the head representations to obtain third vector representations of the respective head representations, and merging the third vector representations of the head representations in the respective word vectors to obtain the updated word vectors; and performing training of the neural machine translation model or translating using the updated word vectors.

As known by a person skilled in the art, the elements and algorithm steps of the embodiments disclosed herein may be implemented by electronic hardware or a combination of computer software and electronic hardware. Whether these functions are performed in hardware or software depends on the specific application and design constraints of the solution. A person skilled in the art may use different methods for implementing the described functions for each particular application, but such implementation should not be considered to be beyond the scope of the present invention.

As clearly understood by a person skilled in the art, for the convenience and brevity of the description, the specific working process of the system, the device and the unit described above may refer to the corresponding process in the above method embodiment, and detailed descriptions are omitted here.

In the embodiments of the present application, it should be understood that the disclosed apparatus and method may be implemented in other manners. For example, the device embodiments described above are merely illustrative. For example, the division of the unit is only a logical function division. In actual implementation, there may be another division manner, for example, units or components may be combined or be integrated into another system, or some features may be ignored or not executed. In addition, the coupling or direct coupling or communication connection described above may be an indirect coupling or communication connection through some interface, device or unit, and may be electrical, mechanical or the like.

The units described as separate components may be or may not be physically separated, and the components displayed as units may be or may not be physical units, that is to say, may be located in one place, or may be distributed to network units. Some or all of the units may be selected according to actual needs to achieve the objectives of the embodiments of the present invention.

In addition, each functional unit the embodiments of the present invention may be integrated into one processing unit, or each unit may exist physically separately, or two or more units may be integrated into one unit.

The functions may be stored in a computer readable storage medium if the functions are implemented in the form of a software functional unit and sold or used as an independent product. Based on such understanding, the technical solution of the present invention, which is essential or contributes to the prior art, or a part of the technical solution, may be embodied in the form of a software product, which is stored in a storage medium, including instructions that are used to cause a computer device (which may be a personal computer, a server, or a network device, etc.) to perform all or a part of the steps of the methods described in the embodiments of the present invention. The above storage medium includes various media that can store program codes, such as a USB flash drive, a mobile hard disk, a ROM, a RAM, a magnetic disk, or an optical disk.

The present invention is not limited to the specifically described embodiments, and various modifications, combinations and replacements may be made without departing from the scope of the present invention.

What is claimed is:

1. A method for processing word vectors of a neural machine translation model, the method comprising:
    obtaining a word vector sequence that is input to an encoder and a decoder of the neural machine translation model, the word vector sequence including at least two word vectors;
    dividing each word vector in the word vector sequence into a plurality of head representations with the same dimension;
    calculating, for each head representation serving as a target head representation, a first vector representation of the target head representation in a target word vector to which the target head representation belongs, the first vector representation being a non-linear function of a first intermediate vector, and the first intermediate vector being obtained by calculating a weighted sum of the head representations in the target word vector based on correlation parameters between respective head representations in the target word vector and the target head representation;
    calculating a weighted sum of head representations corresponding to respective word vectors in a target word vector sequence to which the target head representation belongs, based on attention parameters between the target head representation and head representations corresponding to respective word vectors in the target word vector sequence, to obtain a second vector representation of the target head representation among word vectors of the target word vector sequence;
    combining the first vector representation and the second vector representation of each of the head representations to obtain third vector representations of the respective head representations, and merging the third vector representations of the head representations in the respective word vectors to obtain the updated word vectors; and
    training the neural machine translation model or translating using the updated word vectors.

2. The method for processing word vectors of the neural machine translation model as claimed in claim 1,
    wherein calculating the first vector representation of the target head representation in the target word vector to which the target head representation belongs includes
    calculating the weighted sum of the head representations in the target word vector based on the correlation parameters between the respective head representations in the target word vector and the target head representation, to obtain the first intermediate vector, the correlation parameters being model parameters updated by learning during a training process of the neural machine translation model; and
    converting the first intermediate vector into word vector representations with the same dimension using a preset non-linear function, to obtain the first vector representation of the target head representation in the target word vector.

3. The method for processing word vectors of the neural machine translation model as claimed in claim 2,
    wherein calculating the weighted sum of the head representations in the target word vector based on the correlation parameters between the respective head representations in the target word vector and the target head representation includes
    performing normalization processing on the correlation parameters between the respective head representations in the target word vector and the target head representation to obtain respective first weights of the head representations in the target word vector; and
    calculating the weighted sum of the head representations in the target word vector based on the respective first weights, to obtain the first intermediate vector.

4. The method for processing word vectors of the neural machine translation model as claimed in claim 2,
    wherein the non-linear function is a hyperbolic tangent (tanh) function, an S-shaped growth curve (Sigmoid) function, or a rectified linear (ReLU) function.

5. The method for processing word vectors of the neural machine translation model as claimed in claim 1,
    wherein calculating the weighted sum of the head representations corresponding to the respective word vectors in the target word vector sequence to which the target head representation belongs, based on the attention parameters between the target head representation and the head representations corresponding to the respective word vectors in the target word vector sequence includes
    calculating the attention parameters between the target head representation and the head representations corresponding to the respective word vectors in the target word vector sequence, based on a preset attention function;
    performing normalization processing on the attention parameters between the target head representation and the head representations corresponding to the respective word vectors in the target word vector sequence to obtain respective second weights of the head representations corresponding to the respective word vectors in the target word vector sequence; and
    calculating the weighted sum of the head representations corresponding to the respective word vectors in the target word vector sequence based on the respective second weights, to obtain the second vector representation of the target head representation among word vectors of the target word vector sequence.

6. The method for processing word vectors of the neural machine translation model as claimed in claim 1,
wherein combining the first vector representation and the second vector representation of the head representation to obtain the third vector representation of the head representation includes
calculating a first product of a first combination parameter and the first vector representation of the head representation, calculating a second product of a second combination parameter and the second vector representation of the head representation, and calculating a sum of the first product and the second product to obtain the third vector representation of the head representation,
wherein the first combination parameter and the second combination parameter are model parameters updated by learning during a training process of the neural machine translation model.

7. An apparatus for processing word vectors of a neural machine translation model, the apparatus comprising:
a memory storing computer-executable instructions; and
one or more processors configured to execute the computer-executable instructions such that the one or more processors are configured to
obtain a word vector sequence that is input to an encoder and a decoder of the neural machine translation model, the word vector sequence including at least two word vectors;
divide each word vector in the word vector sequence into a plurality of head representations with the same dimension;
calculate, for each head representation serving as a target head representation, a first vector representation of the target head representation in a target word vector to which the target head representation belongs, the first vector representation being a non-linear function of a first intermediate vector, and the first intermediate vector being obtained by calculating a weighted sum of the head representations in the target word vector based on correlation parameters between respective head representations in the target word vector and the target head representation;
calculate a weighted sum of head representations corresponding to respective word vectors in a target word vector sequence to which the target head representation belongs, based on attention parameters between the target head representation and head representations corresponding to respective word vectors in the target word vector sequence, to obtain a second vector representation of the target head representation among word vectors of the target word vector sequence;
combine the first vector representation and the second vector representation of each of the head representations to obtain third vector representations of the respective head representations, and merge the third vector representations of the head representations in the respective word vectors to obtain the updated word vectors; and
train the neural machine translation model or translate using the updated word vectors.

8. The apparatus for processing word vectors of the neural machine translation model as claimed in claim 7,
wherein the one or more processors are configured to
calculate the weighted sum of the head representations in the target word vector based on the correlation parameters between the respective head representations in the target word vector and the target head representation, to obtain the first intermediate vector, the correlation parameters being model parameters updated by learning during a training process of the neural machine translation model; and
convert the first intermediate vector into word vector representations with the same dimension using a preset non-linear function, to obtain the first vector representation of the target head representation in the target word vector.

9. The apparatus for processing word vectors of the neural machine translation model as claimed in claim 8,
wherein the one or more processors are configured to
perform normalization processing on the correlation parameters between the respective head representations in the target word vector and the target head representation to obtain respective first weights of the head representations in the target word vector; and
calculate the weighted sum of the head representations in the target word vector based on the respective first weights, to obtain the first intermediate vector.

10. The apparatus for processing word vectors of the neural machine translation model as claimed in claim 8,
wherein the non-linear function is a hyperbolic tangent (tanh) function, an S-shaped growth curve (Sigmoid) function, or a rectified linear (ReLU) function.

11. The apparatus for processing word vectors of the neural machine translation model as claimed in claim 7,
wherein the one or more processors are configured to
calculate the attention parameters between the target head representation and the head representations corresponding to the respective word vectors in the target word vector sequence, based on a preset attention function;
perform normalization processing on the attention parameters between the target head representation and the head representations corresponding to the respective word vectors in the target word vector sequence to obtain respective second weights of the head representations corresponding to the respective word vectors in the target word vector sequence; and
calculate the weighted sum of the head representations corresponding to the respective word vectors in the target word vector sequence based on the respective second weights, to obtain the second vector representation of the target head representation among word vectors of the target word vector sequence.

12. The apparatus for processing word vectors of the neural machine translation model as claimed in claim 7,
wherein the one or more processors are configured to
calculate a first product of a first combination parameter and the first vector representation of the head representation, calculate a second product of a second combination parameter and the second vector representation of the head representation, and calculate a sum of the first product and the second product to obtain the third vector representation of the head representation,
wherein the first combination parameter and the second combination parameter are model parameters updated by learning during a training process of the neural machine translation model.

13. A non-transitory computer-readable recording medium having computer-executable instructions for execution by one or more processors, wherein, the computer-executable instructions, when executed, cause the one or more processors to carry out a method for processing word vectors of a neural machine translation model, the method comprising:

obtaining a word vector sequence that is input to an encoder and a decoder of the neural machine translation model, the word vector sequence including at least two word vectors;

dividing each word vector in the word vector sequence into a plurality of head representations with the same dimension;

calculating, for each head representation serving as a target head representation, a first vector representation of the target head representation in a target word vector to which the target head representation belongs, the first vector representation being a non-linear function of a first intermediate vector, and the first intermediate vector being obtained by calculating a weighted sum of the head representations in the target word vector based on correlation parameters between respective head representations in the target word vector and the target head representation;

calculating a weighted sum of head representations corresponding to respective word vectors in a target word vector sequence to which the target head representation belongs, based on attention parameters between the target head representation and head representations corresponding to respective word vectors in the target word vector sequence, to obtain a second vector representation of the target head representation among word vectors of the target word vector sequence;

combining the first vector representation and the second vector representation of each of the head representations to obtain third vector representations of the respective head representations, and merging the third vector representations of the head representations in the respective word vectors to obtain the updated word vectors; and training the neural machine translation model or translating using the updated word vectors.

14. The non-transitory computer-readable recording medium as claimed in claim 13, wherein calculating the first vector representation of the target head representation in the target word vector to which the target head representation belongs includes calculating the weighted sum of the head representations in the target word vector based on the correlation parameters between the respective head representations in the target word vector and the target head representation, to obtain the first intermediate vector, the correlation parameters being model parameters updated by learning during a training process of the neural machine translation model; and converting the first intermediate vector into word vector representations with the same dimension using a preset non-linear function, to obtain the first vector representation of the target head representation in the target word vector.

15. The non-transitory computer-readable recording medium as claimed in claim 14, wherein calculating the weighted sum of the head representations in the target word vector based on the correlation parameters between the respective head representations in the target word vector and the target head representation includes performing normalization processing on the correlation parameters between the respective head representations in the target word vector and the target head representation to obtain respective first weights of the head representations in the target word vector; and calculating the weighted sum of the head representations in the target word vector based on the respective first weights, to obtain the first intermediate vector.

16. The non-transitory computer-readable recording medium as claimed in claim 14, wherein the non-linear function is a hyperbolic tangent (tanh) function, an S-shaped growth curve (Sigmoid) function, or a rectified linear (ReLU) function.

17. The non-transitory computer-readable recording medium as claimed in claim 13, wherein calculating the weighted sum of the head representations corresponding to the respective word vectors in the target word vector sequence to which the target head representation belongs, based on the attention parameters between the target head representation and the head representations corresponding to the respective word vectors in the target word vector sequence includes calculating the attention parameters between the target head representation and the head representations corresponding to the respective word vectors in the target word vector sequence, based on a preset attention function;

performing normalization processing on the attention parameters between the target head representation and the head representations corresponding to the respective word vectors in the target word vector sequence to obtain respective second weights of the head representations corresponding to the respective word vectors in the target word vector sequence; and calculating the weighted sum of the head representations corresponding to the respective word vectors in the target word vector sequence based on the respective second weights, to obtain the second vector representation of the target head representation among word vectors of the target word vector sequence.

18. The non-transitory computer-readable recording medium as claimed in claim 13, wherein combining the first vector representation and the second vector representation of the head representation to obtain the third vector representation of the head representation includes calculating a first product of a first combination parameter and the first vector representation of the head representation, calculating a second product of a second combination parameter and the second vector representation of the head representation, and calculating a sum of the first product and the second product to obtain the third vector representation of the head representation, wherein the first combination parameter and the second combination parameter are model parameters updated by learning during a training process of the neural machine translation model.

* * * * *